(Model.)

M. C. NILES.
LATCH.

No. 269,097. Patented Dec. 12, 1882.

Witnesses
W. C. Coolies
Geo. R. Cutler.

Inventor
Milton C. Niles
By Coburn & Thacher
Attorneys

UNITED STATES PATENT OFFICE.

MILTON C. NILES, OF OAK PARK, ILLINOIS.

LATCH.

SPECIFICATION forming part of Letters Patent No. 269,097, dated December 12, 1882.

Application filed March 25, 1882. (Model.)

*To all whom it may concern:*

Be it known that I, MILTON C. NILES, a citizen of the United States, residing at Oak Park, in the county of Cook and State of Illinois, have invented certain new and useful Improvements in Knob-Latches, fully set forth in the following specification, reference being had to the accompanying drawings, in which—

Figure 1:
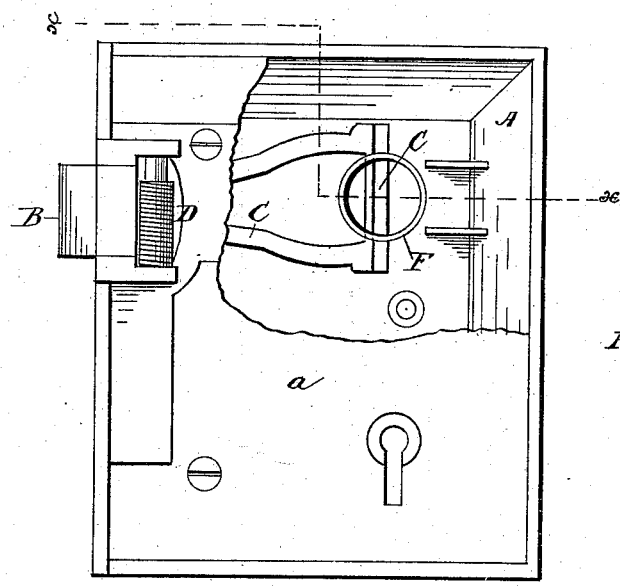
Figures 2, 3, 4, 5:
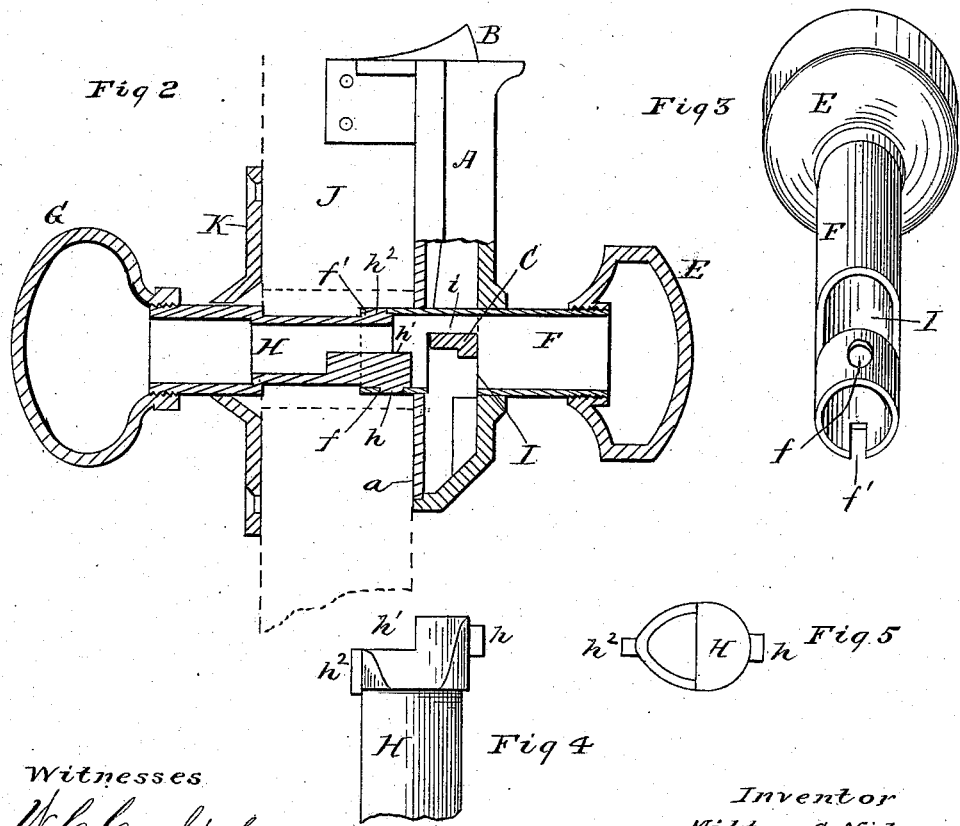

Figure 1 represents a back elevation of the lock-case and parts inclosed therein, a portion of the back-plate being broken away to disclose the latter; Fig. 2, a sectional view showing a portion of the door with lock-case, latch, and knobs in position, the section being taken on the line $xx$, Fig. 1; Fig. 3, a perspective view of one of the knobs and its shank detached from the door and case; Fig. 4, a longitudinal section of the inner end of the opposite knob-shank, and Fig. 5 an inner end elevation of the same.

My invention relates to rim-locks.

It consists in certain special constructions of the knob-shanks, whereby they are readily connected together at their inner ends and serve the purpose of the usual spindle by which the bolt-talons are operated.

I will proceed to describe specifically the construction and operation of my present invention, and will then point out definitely in the claims the special improvements which I believe to be new and wish to protect by Letters Patent.

In the drawings, A represents the lock-case, which is of any ordinary construction and is provided with the usual back plate, $a$. In this instance the improvement is shown applied to a swinging bolt, B, operated in the usual way by talons C and a spring, D, all of which parts are well known, and are shown and fully described in patents heretofore granted to me. The knob E on the lock side of the door is attached to a tubular shank, F, and the knob G on the opposite side of the door is attached to a similar shank, H. These knob-shanks are made independent of each other, but are provided with means by which at their inner ends they may be readily connected and disconnected. An aperture, $f$, is made in the side of the shank F, very near the inner end thereof, as shown in Fig. 3 of the drawings, and the inner end of the opposite shank, H, is made a little smaller than the shank F, so that it will enter the latter, and is provided with a short side lug or pin, $h$, adapted to enter the aperture in the shank F, mentioned above. Preferably the end of the shank H is oval-shaped, and is partially filled, as shown in Fig. 5 of the drawings, this shape facilitating the adjustment of the shank in the end of the one opposite, for obviously, if it were in the shape of a true circle and of a size just to fit into the shank F, it would be impossible to insert it in the latter, except when held in a nearly straight line therewith; but if the side of the shank opposite to the lug is reduced to the oval form shown, it may be inserted, when considerably inclined, far enough to permit the pin to enter the aperture $f$, and then straightened or brought into line with its companion. The side opposite the pin may also be cut down slightly, so as to present the appearance of a rabbet, $h'$, as shown in Fig. 4 of the drawings, leaving just enough of the shank to enter and hold in the end of the opposite shank when the pin engages in its aperture, as shown in Fig. 2 of the drawings. This fastening device is sufficient to connect the two shanks securely together when in place on the door, so that they become practically one piece, and may be turned by either of the knobs; but, for additional security, if desired, a lug, $h^2$, may be made on the outside of the shank H, opposite to the lug $h$, and at the extreme inner end thereof. A corresponding notch, $f'$, is cut into the edge of the inner end of the shank F, so that when the former shank is inserted in the latter, as above described, and then brought into line therewith, the lug or pin $h^2$ will set into this notch, as shown in Fig. 2 of the drawings, and so the two will be held together on each side.

The shank F is intended to be made of such length as to pass through the lock-case and into the door; and as I desire to operate the bolt-talons directly by the knob-shanks, I cut away a portion of one side of this shank, as shown at I in the drawings. This notch or recess I is made at such a distance from the end of the shank that when the latter is in proper position on the door the opening will be within the case and in line with the talons, and it is of a width to receive the yoke end of the talons, as shown in Fig. 2 of the drawings. Obviously, then, the portion of the shank opposite to this recess, remaining entire, will form a cam, $i$, by means of which the bolt-talons will be actuated, if the shank is properly arranged in the case with the recess turned away from the bolt and the yoke end of the talons in place therein, as shown in Fig. 1 of the drawings. This is the arrangement of the several parts when put in working position on the door, as shown in Fig. 2 of the drawings, and in this position obviously the oscillation of either one of the knobs will throw the bolt by means of the cam-section $i$, each edge of which rests against the yoke end of the talons and acts against the spring of the latter.

To put the parts into working position, the bolt-talons and spring being in place in the case, the knob-shank F is inserted from the outside, the talons being thrown back so that the shank will pass through within the yoke until the end piece is received in the recess I, which is turned away from the bolt. The back plate is then secured in place and the lock-case fastened to the door J, the inner end of the shank extending through the case and into the opening through the door. The shank H is then introduced from the opposite side of the door, the rose K being loose thereon to permit lateral movement, and the inner ends of the shanks are connected together within the door, as above described, when the shank H is brought into line with its companion and the rose fastened to the door, thereby retaining the shank H in its proper alignment, in which position the two shanks are permanently fastened together and cannot be disconnected until the rose is displaced. By reversing these steps the knob-shanks can be readily disconnected for any purpose whatever. It will be seen, then, that the bolt is thrown by the knob-shanks alone, and that the latter are connected together without the use of an additional piece, and thus a very cheap, simple, and effective device is obtained. It will be seen from the above description of the construction and operation of the several parts that the knob-shank is held in place in the case by the bolt-talons, for when the latter are received within the recess cut across the shank F the talons will prevent the shank from sliding back and forth in the case.

The knob-shanks are described above as tubular; but this construction is not necessary, as they may be made solid, or at least partly so, and still embody my invention.

I have shown this improvement applied in the simplest way. It is obvious, however, that it may be used in connection with a tube inserted in the door, as shown in some of my prior patents; and it is also obvious that it may be used in connection with bolts of a different kind from that mentioned herein, and with different kinds of locks, the only change required being an adaptation of the parts to the peculiar style of lock employed. It will be understood, therefore, that I do not limit my improvement entirely to the special details of construction in all respects as herein shown and described.

Having thus described my invention, what I claim as new, and desire to secure by Letters Patent, is—

1. The knob-shank F, in combination with the knob-shank H and devices on the inner ends of said parts, substantially as described, whereby they are connected directly to each other without the intervention of screws or of a separate fastening-piece, substantially as and for the purposes set forth.

2. The knob-shank F, provided with the aperture $f$, in combination with the opposite shank, H, provided with the connecting lug or pin $h$, substantially as and for the purposes set forth.

3. The knob-shank F, provided with the aperture $f$, in combination with the opposite shank, H, provided with the connecting lug or pin $h$, and reduced to an oval shape or cut away on the sides receding from the lug or pin, substantially as and for the purposes set forth.

4. The knob-shank F, provided with the aperture $f$ and the notch $f'$, in combination with the opposite shank, H, provided with the connecting lug or pin $h$ and the lug $h^2$, substantially as and for the purposes set forth.

5. The lock-case, in combination with the inside knob-shank, and the bolt-talons connected directly to the shank within the case, and arranged to prevent the shank from sliding in the case, substantially as described.

6. The lock-case, in combination with the bolt-talons C, provided with a yoke end of a width corresponding to the space between the front and back plates of the case, and the inner knob-shank, F, provided with a transverse recess, I, cut in one side thereof, in which is fitted the yoke end of the talons within the case, substantially as and for the purposes set forth.

7. The knob-shank F, provided with the transverse recess I and the aperture $f$, in combination with the bolt-talons C and the knob-shank, H, provided with the connecting lug or pin $h$, substantially as described.

8. The knob-shank F, provided with the aperture $f$, in combination with the opposite shank, H, provided with the connecting lug or pin $h$, and the rose K, arranged to hold the shank H in a line with the shank F, and thereby prevent disconnection, substantially as described.

MILTON C. NILES.

Witnesses:
JNO. C. MACGREGOR,
G. E. FAULKNER.